United States Patent [19]

Cantor et al.

[11] Patent Number: 4,562,660
[45] Date of Patent: Jan. 7, 1986

[54] FISHING NET HANGING JIG

[76] Inventors: Clifford A. Cantor, 841 Alder St.; Ben D. Barnes, 1120 Mission Lake Rd., both of Bethel, Ak. 99559

[21] Appl. No.: 694,119

[22] Filed: Jan. 23, 1985

[51] Int. Cl.⁴ .............................................. A01K 71/00
[52] U.S. Cl. ................................................ 43/4; 43/7; 289/18.1
[58] Field of Search ............................ 43/1, 4, 8, 6.5, 7, 43/4.5; 33/192, 180 R; 87/12, 53; 289/18.1

[56] References Cited

U.S. PATENT DOCUMENTS 3,481,065 12/1969 Whaley .................................. 43/4.5
4,184,645 1/1980 Starling ....................................... 43/1

Primary Examiner—Nicholas P. Godici
Assistant Examiner—G. M. Reid
Attorney, Agent, or Firm—Cullen, Sloman, Cantor, Grauer, Scott and Rutherford

[57] ABSTRACT

A fishing net hanging jig, for tying a net to either the float or lead line, is formed of an upright stanchion, rigidly mounted upon a support, and an L-shaped member having a horizontal leg, which is horizontally adjustably secured to the stanchion, and an upright vertical leg. A thin pointer is provided upon the upper end of the stanchion, and a line support fork is provided upon the upper end of the vertical leg. The space between the pointer and fork is acurately set by horizontally adjusting and then locking the horizontal leg to the stanchion. A cord is passed through a number of mesh loops of the net and is tied to the line by supporting the line at the last tied knot and stretching the line to the pointer. The next knot may be tied at, or around the pointer, and then the line may be pulled free of the pointer and may be re-positioned for tying the next sequential knot.

7 Claims, 9 Drawing Figures

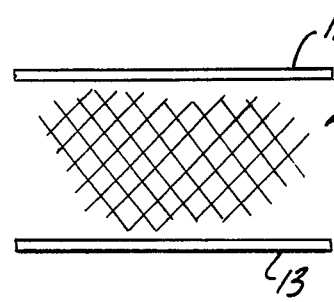
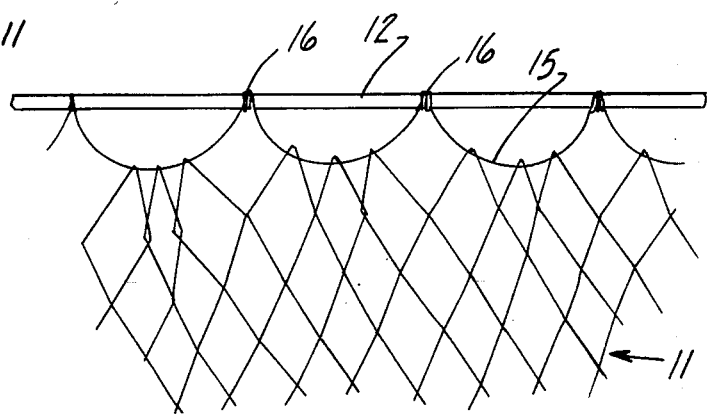
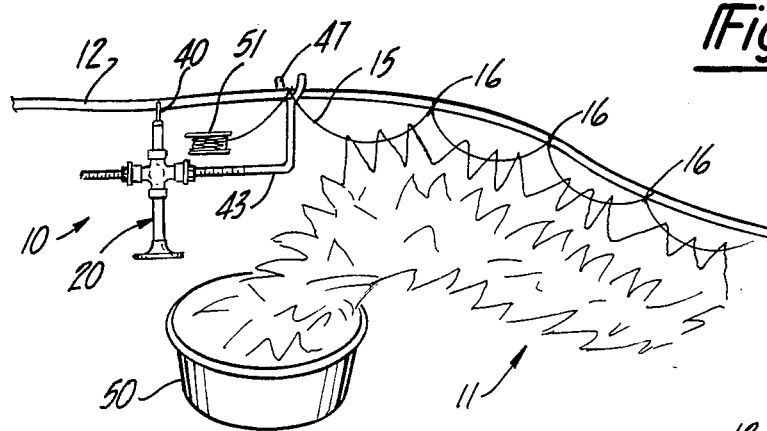
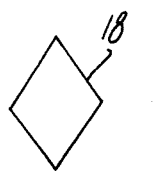
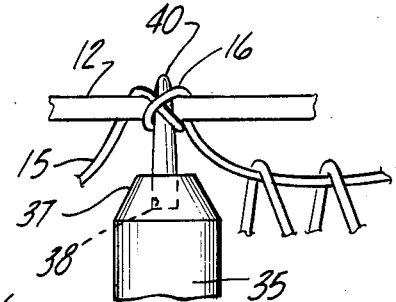
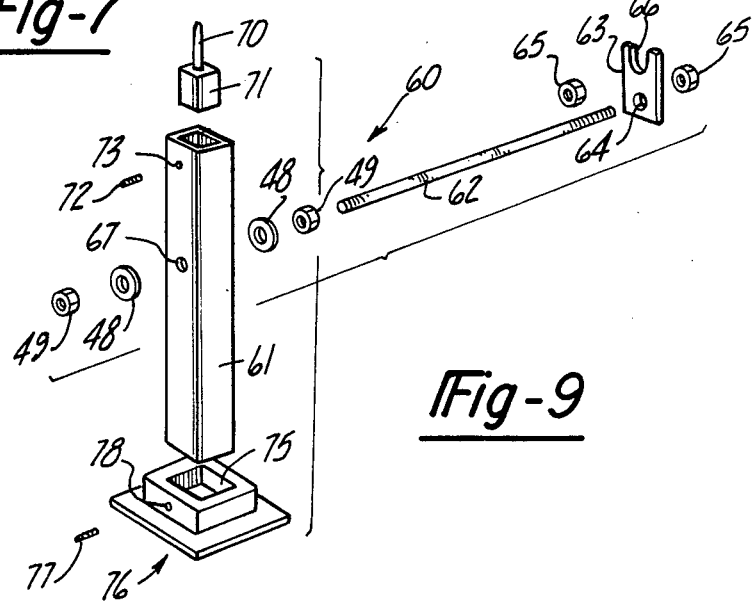

FISHING NET HANGING JIG

BACKGROUND OF INVENTION

This invention relates to a jig useful for hanging mesh-type fishing nets from their float lines or lead lines.

Commercial fishing nets may be formed of mesh which may be hundreds of feet, or even hundreds of fathoms, long and a number of feet deep. The upper edge of the mesh is tied to an elongated float line. The lower edge of the mesh is tied to a lead line so that the mesh floats approximately vertically in the water. Attaching the mesh to the two lines is performed by a process known as "net hanging".

The net hanging process typically involves stringing a cord, referred to as twine, through a series of adjacent mesh loops and then tying the cord to the line. The cord is then strung through the next group of mesh loops and retied to the line, with this repeated along the length of the line. Thus, the large mesh sheet is loosely secure to the respective lines, by the cord, which is attached at spaced locations to the lines.

The hanging process is performed by hand. The hanger manually slips the cord or twine through adjacent mesh loops, makes the knot which ties the twine to the line, then repeats the process manually along the length of the net. This is a time consuming and exacting task, particularly, since the space between each adjacent pair of knots is critical to the operation of the net.

Depending upon the spacing between the knots, the mesh net is hung either more or less loosely along the length of the line. This results in variations in the width of the individual mesh loops, i.e., they may be wider or else, narrower and more vertically elongated. In turn, this configuration of the mesh loops affects the net's fish catching properties.

Fisherman typically prefer different widths of the mesh loops for different fishing conditions. Thus, there are different preferences for the spacings between the knots. But, for any one net, the spacing between the knots must be uniform. This is very difficult to achieve manually.

The invention herein is concerned with a jig which accurately spaces the adjacent knots for the net hanger and permits him to make the required knots rapidly, much faster than by other techniques available.

Previous techniques involved simply measuring or marking the spaces between one finished knot to the location of the next knot to be applied. However, that technique is relatively slow, compared to the jig of this invention. Moreover, the previous techniques lack precision, particularly where the net is long and requires a large number of knots so that the net hanger has difficulty in repetitively tying precisely the same distance between adjacent knots along this long length. Attempts have been made to use devices to assist the net hanger. But, such devices were very cumbersome, not easily or precisely adjustable, and not as strong as is desirable for the intended purpose.

SUMMARY OF THE INVENTION

The invention contemplates providing a jig for assisting the net hanger to more rapidly and precisely tie the knots between the mesh supporting cord and the fishing net float line or lead line. The jig utilizes a vertical stanchion, whose lower end is rigidly fastened upon a fixed support, and whose upper end is provided with a rigid, narrow, elongated pointer. An L-shaped, rodlike member is provided with a horizontal leg which is horizontally adjustably fastened upon the stanchion so that it may be shifted longitudinally and fixed in position. One end of the L-shaped member forms a vertical leg which extends upwardly and terminates in a support fork, like a tree crotch.

The distance between the fork and the pointer can be precisely set and fixed. Thus, the net hanger can tie the cord to the line, then position that knot at the fork. Then, the cord, after being passed through several mesh loops, can be tied to the line at and around the pointer. Pulling the line free of the pointer, results in the knot being precisely located relative to the first tied knot. This process can then be repeated with the jig, for as long as necessary, to tie the knots along the length of the net.

As can be seen, the invention contemplates a jig construction which is simple and inexpensive and sturdy in construction so that it may be used and kept for a long time even under adverse or rough handling conditions. The simple construction permits swift and easy adjustment of the space between the fork and the pointer by merely loosening locking nuts and moving the L-shaped member horizontally relative to the support stanchion, and then retightening the nuts.

An object of this invention is to provide a jig which is made of inexpensive, readily available parts, as for example, common plumbing parts and the like, which can be rapidly assembled and which will withstand rough treatment and harsh weathering conditions that are encountered in fishing operations and particularly, which will withstand the considerable force which will be applied to it in the net-hanging process.

A further object is to provide a jig which requires no skill and only a wrench, to adjust, assemble, disassemble and use. Thus, although the net hanger's job is a skilled one, even relatively unskilled people can perform the net hanging job with respectable accuracy and with minimal skills because of the assistance of the jig as the jig itself does not require a skilled mechanic to use.

Still a further object is to provide a jig which can be rapidly adjusted with respect to size to give a desired, predetermined, accurate spacing between the cord knots so as to adjust the size and shape of the individual mesh loops on a fishing net mesh with minimal time and effort.

These and other objects and advantages will become apparent upon reading the following description, of which the attached drawings form a part.

BRIEF DESCRIPTION OF THE DRAWINGS

FIG. 3 is a schematic view of a fragment of a typical fishing net with the mesh not yet tied to the lines;

FIG. 4 shows a fragment of the hung, upper portion of the fishing net, that is, with the mesh net tied to the float line;

FIG. 5 is a schematic, perspective view showing the process of hanging the net upon the line;

FIG. 6 is an enlarged schematic view showing tying a knot upon the line;

FIG. 7 illustrates a single mesh loop which is wide, as if the net is stretched lengthwise; and FIG. 8 shows a mesh loop which is vertically elongated, as if the mesh net is loosely stretched longitudinally.

FIG. 9 shows a perspective view of modification of the structure of the jig, with the parts shown disassembled.

DETAILED DESCRIPTION

The jig 10, is for the purpose of assisting the net hanger to accurately locate the knots in the twine which fastens the mesh loops to either the upper float line or the lower lead line of the net. FIG. 3 schematically illustrates a typical fishing net. The net mesh 11 may be of a considerable length in a horizontal direction, sometimes as much as hundreds of fathoms, other times a much shorter distance, such as a hundred feet more or less. The height of the net, that is, the vertical float height may vary depending upon the type of net and the purpose. For example, it may be on the order of 35 feet in height, or considerably more or less. The mesh net is fastened to the conventional float line 12 and lead line 13.

As illustrated in FIG. 4, the fastening of the mesh net to either the upper float line or the lower lead line is accomplished by means of a cord or twine 15 which is slipped through a series of adjacent mesh loops and tied by knots 16 to the particular line. The number of loops that are picked up by the twine between any pair of knots, and thereby, securing the loops of the mesh to the float line or lead line, is a variable parameter. That parameter is not of much importance here. In general, picking up fewer loops of mesh between adjacent knots of twine results in a better net, but a more time-consuming hanging process.

Once the net hanger has chosen the number of loops that he will pick up between adjacent knots in the twine, the width of the individual mesh loops in the completely hung net is determined entirely by the exact spacing between the knots in the twine. Leaving a greater space between adjacent knots results in mesh loops which are stretched wider (or "tighter", in the terminology of the trade) as illustrated schematically in FIG. 7. Leaving less space between adjacent knots results in mesh loops which are narrower (or "looser") as schematically illustrated in FIG. 8.

The amount of slack left in the twine is a parameter of importance for other reasons, but does not affect the width of the mesh loops in the completely-hung net.

Further, tightening the twine moves the mesh closer to the float line or lead line, but, does not change the width of the loop diamond-like configurations. These various loop configurations are known, and within the choice of the individual fishermen who use such nets.

Figure 1:
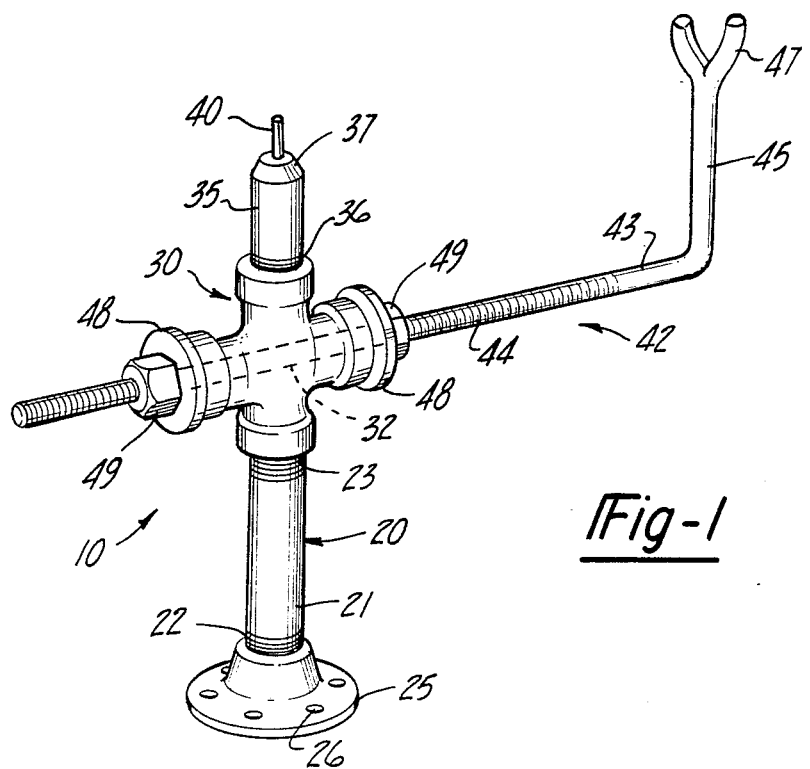
FIG. 1 is a perspective view of the fish net hanging jig.
Figure 2:
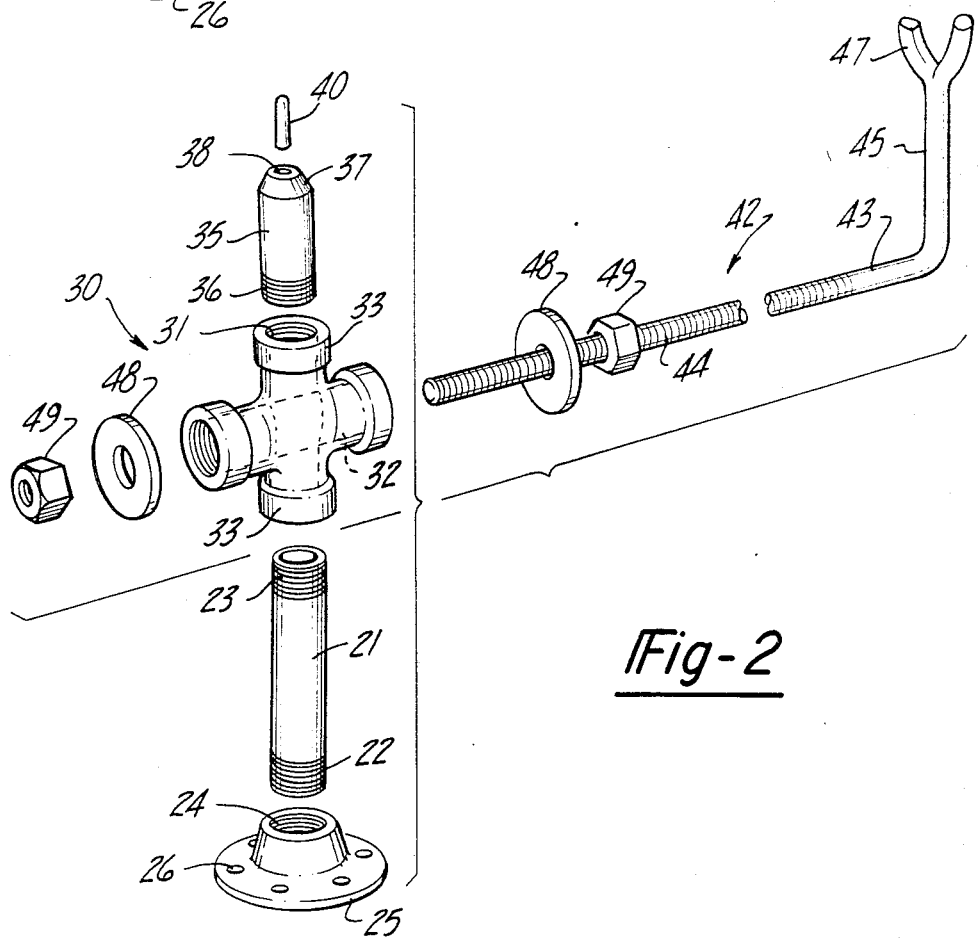
FIG. 2 is a perspective view of the jig parts in disassembled relationship.

Turning to the construction of the jig, as illustrated in FIGS. 1 and 2, the jig includes first, a post or stanchion 20. This may be made of an upright pipe, like a plumbing tube or steel pipe 21 having a threaded lower end 22 and a threaded upper end 23. The lower end is threadedly engaged within the threaded socket 24 of a pipe flange 25. The pipe flange is provided with screw holes 26 so that it may be permanently fastened upon a table, a boat gunwale or some other fixed and rigid support. Thus, the flange may stay in place when the jig is removed and is available for supporting the jig whenever needed.

The stanchion also includes a four-way pipe connector 30 which has a threaded end vertical opening 31 and a horizontal passage or opening 32. The four open ends of the connector may be provided with enlarged heads or collars 33, as is conventional in plumbing connectors of this type.

The upper end of the stanchion is formed by an upper extension 35 which may be formed of a solid rod or a tube, having a threaded lower end 36 and preferably, a tapered upper end 37 having a central drilled socket 38. A pointer 40 is inserted and fastened within the socket. This pointer is made of a rigid, wire-like elongated member, such as like a heavy nail. By inserting the lower end of the member in the socket and welding or brazing it in place, it forms a rigid, narrow vertical extension portion for marking or locating the precise place for knot tying.

Alternatively, the pointer may be removably and replaceably fastened in place. This can be accomplished by threading the socket and providing corresponding threads on the lower end of the pointer so that it may be screw threaded into the socket. In that way, the pointer may be removed and replaced in the event that it is damaged or badly worn.

An L-shaped member 42, which may be made of an elongated rod that is bent into the L-shape, has a horizontal leg 43 upon which threads 44 are formed. Its vertical leg 45 may be bifurcated to form a fork or yoke 47, like the crotch of a tree.

The horizontal leg 43 is inserted through the horizontal opening or passageway 32 in the four-way connector 30. It may be horizontally adjusted, that is, longitudinally movable, to thereby position the fork the desired distance from the pointer. In order to hold the horizontal leg in fixed position, a pair of washers 48 are located on opposite sides of the heads 33 of the horizontal passage 32 and nuts 49 may be used. These nuts engage the horizontal leg thread and are tightened against the heads of the opposite ends of the horizontal passage 32 to lock the position of the L-shaped member.

For adjustment, the nuts can be loosened, the horizontal leg moved in a horizontal direction and thereafter the nuts tightened again to retain the position set.

FIG. 5 schematically illustrates the hanging of the net using the jig. Thus, the net, which is shown as if stored in a large basket or container 50, it is pulled out gradually so that its upper edge can be tied to, for example, the float line. Thus, the hanger first ties the twine end to the line with a knot. Having the first knot, he now positions the line in the crotch or fork with the knot engaged against the fork. Then, the line is stretched to the pointer. The twine is slipped through a number of the mesh loops, as desired to give the final mesh shape, and the hanger now ties the second knot at the pointer.

For good results, the hanger can tie the knot around the pointer itself so that it is encircled and within the knot. After the knot is completed, he can pull the line vertically upwardly to remove the knot from the pointer. Alternatively, he can tie the knot next to the pointer, if he has sufficient skill, and achieve the same predetermined distance required between knots.

The process is repeated continuously, each time placing the last completed knot at the fork and tying the next knot at the pointer.

Although the amount of time required and the amount of skill required may vary, a skilled hanger can tie knots at six inches apart, in a three hundred foot long net, that is, six hundred knots, in about an hour or a little more than that.

The twine itself can be handled by wrapping it upon a conventional needle or shuttle 51. These are common in the trade.

FIG. 9 illustrates a modified jig 60 which operates in the same manner as described above. The stanchion 61 may be made of a single, metal pipe or tube which may be round or square in cross-section. The horizontal leg 62 of the L-shaped member is formed of a metal, threaded rod. The vertical leg 63 may be formed of a metal plate having a hole 64 through which the end of the rod may be inserted and secured, such as by nuts 65 or by welding. The upper end of the plate is notched to form the fork 66.

The opposite end of the leg 62 passes through a hole 67 in the stanchion and is adjustably fastened to the stanchion, using washers 48 and nuts 49, as described above, or the like.

The pointer 70 may be fastened within a plug 71, as by welding. The plug is inserted in the upper end of the stanchion where it may be either permanently fastened, using a weld, or removably secured by a set screw 72 engaged in a threaded opening 73 formed in the stanchion.

The stanchion lower end is held within a socket 75 formed in a flanged base 76 by a set screw 77 fitted through a threaded hole 78, or a like mechanical fastener. Instead of a plate, the vertical leg 63 could be formed of a Y-shaped member similarly connected to the horizontal leg.

Having fully described an operative embodiment of this invention, we now claim:

1. A fishing net hanging jig for use in tying, at accurately spaced apart points, the upper and lower edges of a fishing net mesh to the net float line and lead line respectively with a cord that is passed through a predetermined number of adjacent mesh loops and then is tied by a knot to the respective line, comprising:

a vertical support stanchion having a connection means at its lower end for rigidly fastening the stanchion upon a rigid support;

a narrowed, stiff, upwardly extending pointer on the upper end of the stanchion;

a rod-like elongated L-shaped member having a horizontal leg and a vertical leg;

attachment means on the stanchion, intermediate its upper and lower ends, for rigidly attaching the horizontal leg to the stanchion, with said attachment means being releasable and adjustable for horizontally adjusting and then fixing the position of the horizontal leg relative to the stanchion so as to accurately position the vertical leg remotely from, and at a predetermined space from the stanchion;

a line receiving fork on the upper end of the vertical leg, with the fork being in substantial horizontal alignment with the pointer;

whereby the net line may be positioned for support in the fork at the last completed knot and stretched horizontally and held adjacent the pointer with the pointer accurately indicating the location of the next knot, so that a knot can be applied at the pointer, and thereafter, the net line may be re-positioned for the application of next sequential knot.

2. A fishing net hanging jig as defined in claim 1, and said attachment means comprising a horizontally axised tubular part that is rigidly secured to the stanchion, and through which the horizontal leg is passed;

and cooperating locking means for rigidly fixing the horizontal leg in predetermined position in the tubular part.

3. A fishing net hanging jig as defined in claim 2, and said locking means including a thread formed on the horizontal leg, and at least one nut engaging the thread and the tubular part to lock them together.

4. A fishing net hanging jig as defined in claim 1, and said pointer formed of a thin, rigid, wire-like material, with the pointer being vertically arranged and having its lower end secured to the stanchion.

5. A fishing net hanging jig as defined in claim 4, and including a vertically opening socket formed in the upper end of the stanchion, and the lower end of the pointer being positioned within the socket, for securing the pointer to the stanchion.

6. A fishing net hanging jig for use in tying, at accurately spaced apart points, the upper and lower edges of a fishing net mesh either the net float or lead lines by a cord that is passed through a predetermined number of adjacent mesh loops and then is tied by a knot to the line, comprising:

an upright stanchion formed of a pipe having a pipe connector on its lower end for rigidly fastening it upon a rigid support;

a pipe fitting connected to the upper end of the tube and having a horizontal axised tubular opening;

an elongated, vertical extension secured to the pipe fitting and having a thin, wire-like, vertically extending pointer on the upper end of the extension;

an L-shaped rod member having a threaded horizontal leg portion inserted through said fitting tubular opening, and having a vertical leg;

nut-like members threaded upon the threaded leg portioned on opposite sides of the fitting for locking the horizontal leg in predetermined horizontally adjusted positions, so that the vertical leg is accurately spaced a predetermined distance from the pointer;

a line receiving fork on the upper end of the vertical leg;

wherein the net line may be arranged upon, and with its last tied knot adjacent to, the fork and extended horizontally and held adjacent the pointer so that a knot may be applied at or around the pointer to secure the cord to the line at an accurate, predetermined distance from the last tied knot, and thereafter, the line may be re-positioned for tying the next knot.

7. A fishing net hanging jig as defined in claim 6, and said pipe fitting formed of a four-way fitting, that it, having a pair of perpendicularly crossed intersecting tubular portions, with the horizontal leg extending through the horizontal tubular portion, and the pipe upper end secured within the lower end of the fitting vertical portion and the elongated extension secured within the upper end of the fitting vertical portion.

* * * * *